(12) United States Patent
Minnick et al.

(10) Patent No.: US 10,275,642 B2
(45) Date of Patent: Apr. 30, 2019

(54) CONTEXT-SENSITIVE INFORMATION PRESENTATION

(71) Applicant: DISH Technologies L.L.C., Englewood, CO (US)

(72) Inventors: Danny J. Minnick, Castle Rock, CO (US); Christopher Boyd Tirpak, Monument, CO (US)

(73) Assignee: DISH Technologies L.L.C., Englewood, CO (US)

(*) Notice: Subject to any disclaimer, the term of this patent is extended or adjusted under 35 U.S.C. 154(b) by 813 days.

(21) Appl. No.: 13/940,914

(22) Filed: Jul. 12, 2013

(65) Prior Publication Data

US 2015/0015784 A1 Jan. 15, 2015

(51) Int. Cl.
*G06K 9/00* (2006.01)
*H04N 21/258* (2011.01)
*H04N 21/4223* (2011.01)
*H04N 21/43* (2011.01)
*H04N 21/442* (2011.01)
*H04N 21/45* (2011.01)
*H04N 21/4627* (2011.01)
*H04N 21/475* (2011.01)
*H04N 21/488* (2011.01)

(52) U.S. Cl.
CPC ... *G06K 9/00288* (2013.01); *H04N 21/25875* (2013.01); *H04N 21/4223* (2013.01); *H04N 21/4307* (2013.01); *H04N 21/44218* (2013.01); *H04N 21/44236* (2013.01); *H04N 21/4532* (2013.01); *H04N 21/4627* (2013.01); *H04N 21/4753* (2013.01); *H04N 21/4884* (2013.01)

(58) Field of Classification Search
None
See application file for complete search history.

(56) References Cited

U.S. PATENT DOCUMENTS

| | | | | |
|---|---|---|---|---|
| 6,091,546 | A * | 7/2000 | Spitzer | G02B 27/017 345/8 |
| 2006/0172700 | A1* | 8/2006 | Wu | G06F 21/35 455/41.2 |
| 2010/0226526 | A1* | 9/2010 | Modro | G06K 9/00577 382/100 |
| 2011/0182484 | A1* | 7/2011 | Jeon | G06Q 10/10 382/118 |
| 2012/0230540 | A1* | 9/2012 | Calman | G06K 9/00221 382/103 |
| 2012/0300973 | A1* | 11/2012 | Stone | G06K 9/00449 382/100 |
| 2013/0044130 | A1* | 2/2013 | Geisner | G09G 5/00 345/633 |
| 2013/0329183 | A1* | 12/2013 | Blum | G02C 11/10 351/158 |
| 2014/0278346 | A1* | 9/2014 | Zomet | G06F 17/30707 704/3 |
| 2015/0168724 | A1* | 6/2015 | Iwatsu | G09G 5/377 345/629 |

* cited by examiner

*Primary Examiner* — Samira Monshi
(74) *Attorney, Agent, or Firm* — Kilpatrick Townsend & Stockton LLP

(57) ABSTRACT

Systems and methods for providing a mechanism for a computer user to seamlessly and readily access information that may be supplied by a number of different sources.

25 Claims, 10 Drawing Sheets

A)

B)

C)

D)

CONTEXT-SENSITIVE INFORMATION PRESENTATION

BACKGROUND

Ever-increasing computing device capabilities and high-bandwidth network connections have made available many possibilities to service providers and consumers alike. Recently, consumers have come to expect the ability to seamlessly and with delay access many different types and forms of information with their computing devices.

SUMMARY

This Summary does not in any way limit the scope of the claimed subject matter.

In an aspect, a computer-implemented method is disclosed. The method may include or comprise: receiving from a computing device information that distinguishes an individual from others; querying at least one of a plurality of resources to acquire information about the individual; arranging acquired information about the individual in a particular order based on contextual information about the computing device; and sending at least a subset of information arranged in the particular order to the computing device for presentation by a display device associated therewith.

In an aspect, a computer-implemented method is disclosed. The method may include or comprise: receiving from a computing device a signal associated with the display of programming by a first display device; synchronizing timing of the received signal to particular data associated with the programming displayed by the first display device; and sending to the computing device for presentation by a display device associated therewith in synchrony with the programming the particular data associated with the programming.

In an aspect, a system is disclosed that may include or comprise eyewear and one or more processors and memory coupled to the eyewear, wherein the memory being communicatively coupled with and readable by the one or more processors and having stored therein processor-readable instructions which, when executed by the one or more processors, cause the one or more processors to: send, upon command, information that distinguishes an individual from others and information associated with the display of programming by a display device; send, upon command, information associated with the display of programming by a first display device; and output for presentation within or by a lens associated with the eyewear information acquired about the individual in a particular order based on contextual information about the eyewear when received, and information in synchrony with the display of programming by a first display device when received.

DETAILED DESCRIPTION

Figure 1:
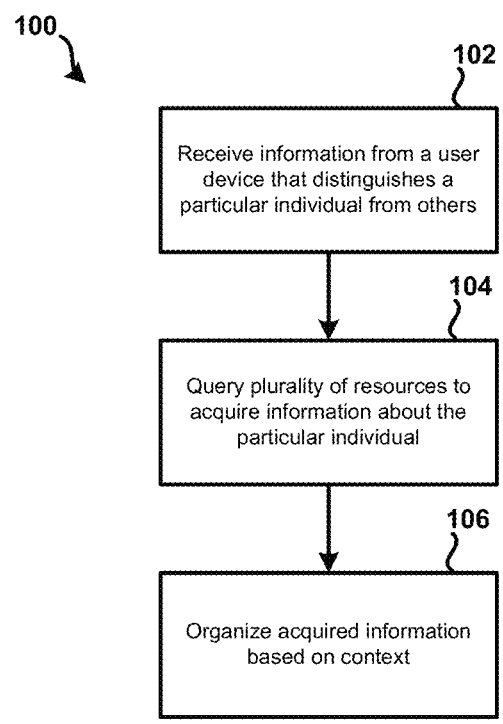
FIG. 1 shows a first example method in accordance with the present disclosure.

The present disclosure is directed to or towards providing a mechanism for a computer user to seamlessly and readily access information that may be supplied by a number of different sources. Although not so limited, an appreciation of the various aspects of the present disclosure may be gained from the following discussion in connection with the drawings. For instance, referring now to FIG. 1, a first example method 100 is shown in accordance with the present disclosure. In general, the example method 100 as described may be performed on or by at least one computing system or device in a networked computing environment. An example of such a computing system or device, and networked computing environment, are discussed below in connection with at least FIG. 5 and FIG. 6. Other embodiments are possible.

At step 102, a computing system may receive information from a mobile device that distinguishes a particular individual from other individuals. Here, a user of the mobile device may use a feature of the same to acquire information of or about the particular individual. For example, the mobile device may be used to acquire a digital image of the particular individual, which may then be sent to the computing system over a network connection. As another example, the mobile device may be used to acquire a digital image of a business card of the particular individual, which may then be sent to the computing system over a network connection. Still other examples are possible. For example, the mobile device may be used to acquire a digital image of a credential of the particular individual, such as a driver's license, identification or security badge, etc., which may then be sent to the computing system over a network connection. Still other embodiments are possible.

In general, it is contemplated that any information that may be captured by the mobile device, and that may be used to distinguish the particular individual from other individuals, may be sent by some communication mechanism to the computing system. For example, the mobile device may be used to "bump" with another mobile device that is associated with the particular individual, to open a communication link between the two devices so that the mobile device may acquire information that distinguishes the particular individual from other individuals. That information may then be sent by some communication mechanism from the mobile device to the computing system, such as by USB (Universal Serial Bus) connection for example. In another example, and assuming that the name of the particular individual is known, the name of the particular individual may be "spoken" and captured by the mobile device. That information may then be sent by some communication mechanism from the mobile device to the computing system, such as by Bluetooth® connection for example. Still other embodiments are possible.

At step 104, the computing system may query a plurality of resources to acquire information about the particular individual. For example, the computing system may process the received information that distinguishes a particular individual from other individuals (see step 102) to extract data that may be used to query one or more publicly-accessible resources, to acquire information about the particular individual. For example, the computing system may perform facial recognition on a digital image of the particular individual, and determine a name of the particular individual, and then initiate a keyword Internet search to acquire and aggregate information about the particular individual. As another example, the computing system may process the received information that distinguishes the particular individual from other individuals to extract data that may be used to query one or more non-publicly-accessible resources, to acquire information about the particular individual. Still other examples are possible. For example, the computing system may be perform character recognition on a digital image of a credential that is associated with the particular individual, and determine a name of the particular individual, and then initiate a keyword search of a personal electronic mail account, calendar, contacts list, task list, etc., to acquire and aggregate information about the particular individual. Still other embodiments are possible.

In general, it is contemplated that the computing system may query any type or form of publicly-accessible and/or non-publicly-accessible resource to acquire information about the particular individual. For example, the computing system may query a publicly-accessible judicial or court case records database to acquire and aggregate information about the particular individual. In another example, the computing system may query one or more data stores associated with a business software, where the data stores are accessible only upon credential verification in light of security measures such as firewalls and the like. Still many other embodiments or examples are possible.

At step 106, the computing system may organize information acquired about the particular individual according to or based on certain situational context. For example, the computing system may itemize or otherwise categorize information acquired about the particular individual (see step 104) based on geographical location of the mobile device, at a particular date/time (e.g., Wednesday, June 19$^{th}$, 3 pm EST) the mobile device was used to acquire the information that distinguishes a particular individual from other individuals (see step 102). For example, the computing system may receive GPS (Global Positioning System) information in addition to the received information that distinguishes the particular individual from other individuals, and determine, estimate, or extrapolate, situational context of mobile device at the particular time, and therefore the user of the mobile device at the particular time.

For example, the computing system may receive GPS information, in addition to other information, and determine that the user of the mobile device is "currently" in attendance at a conference having a central topic of "Augmented Reality." Here, the computing system may organize information acquired about the particular individual in a preferential order including, for example, first listing information about the particular individual related to the topic of augmented reality. This may include, for example, the listing of scholarly papers on the topic of augmented reality published by the particular individual, a curriculum vitae of the particular individual, patents acquired by the particular individual on the topic of augmented reality, etc. Other acquired information about the particular individual may then be listed following or proceeding information about the particular individual related to the topic of augmented reality. This may include, for example, the listing of personal information such as likes, dislikes, age of children, etc. Still other embodiments are possible.

In general, it is contemplated that the computing system may organize information acquired about the particular individual according to or based on any particular situational context that may be derived from information received from the mobile device (see step 102). For example, the computing system may determine that the mobile device at a particular time, and therefore in some embodiments the user of the mobile device at the particular time, is "currently" taking part in, or involved in, etc., a "business" situation or scenario, and then may organize information acquired about the particular individual based on that particular situation or scenario. In another example, the computing system may determine that the mobile device at a particular time, and therefore in some embodiments the user of the mobile device at the particular time, is "currently" taking part in, or involved in, etc., a "law enforcement" situation or scenario, and then may organize information acquired about the particular individual based on that particular situation or scenario. Still other embodiments are possible.

For instance, in another example, the computing system may determine that the mobile device at a particular time, and therefore in some embodiments the user of the mobile device at the particular time, is "currently" taking part in, or involved in, etc., a "security" situation or scenario, and then may organize information acquired based on that particular situation or scenario. In another example, the computing system may determine that the mobile device at a particular time, and therefore in some embodiments the user of the mobile device at the particular time, is "currently" taking part in, or involved in, etc., in a "recreational" situation or scenario, and then may organize information acquired based on that particular situation or scenario. Still other examples are possible.

In the example method 100 of FIG. 1, a computing system may receive from a mobile device information that distinguishes a particular individual from other individuals (see step 102), query a plurality of resources to acquire information about the particular individual (see step 104), and organize information acquired about the particular individual according to or based on certain situational context (see step 106). Such an implementation may be beneficial and/or advantageous in many respects. For example the computing system may send the organized information to the mobile device for presentation by the mobile device. The presentation of the organized information may, in one embodiment, be discreet in nature so that the particular individual may not be aware that the user of the mobile device is accessing information about the particular individual. This may not necessarily be used for nefarious or clandestine purposes. Rather, it may be beneficial for both the user of the mobile device and the particular individual when the user of the mobile device has as much information as possible about the particular individual, so as to be prepared when engaging in conversation with the particular individual for example. Further benefits and/or advantages may be understood in light of the following description in connection with FIGS. 2-10.

Figure 2:
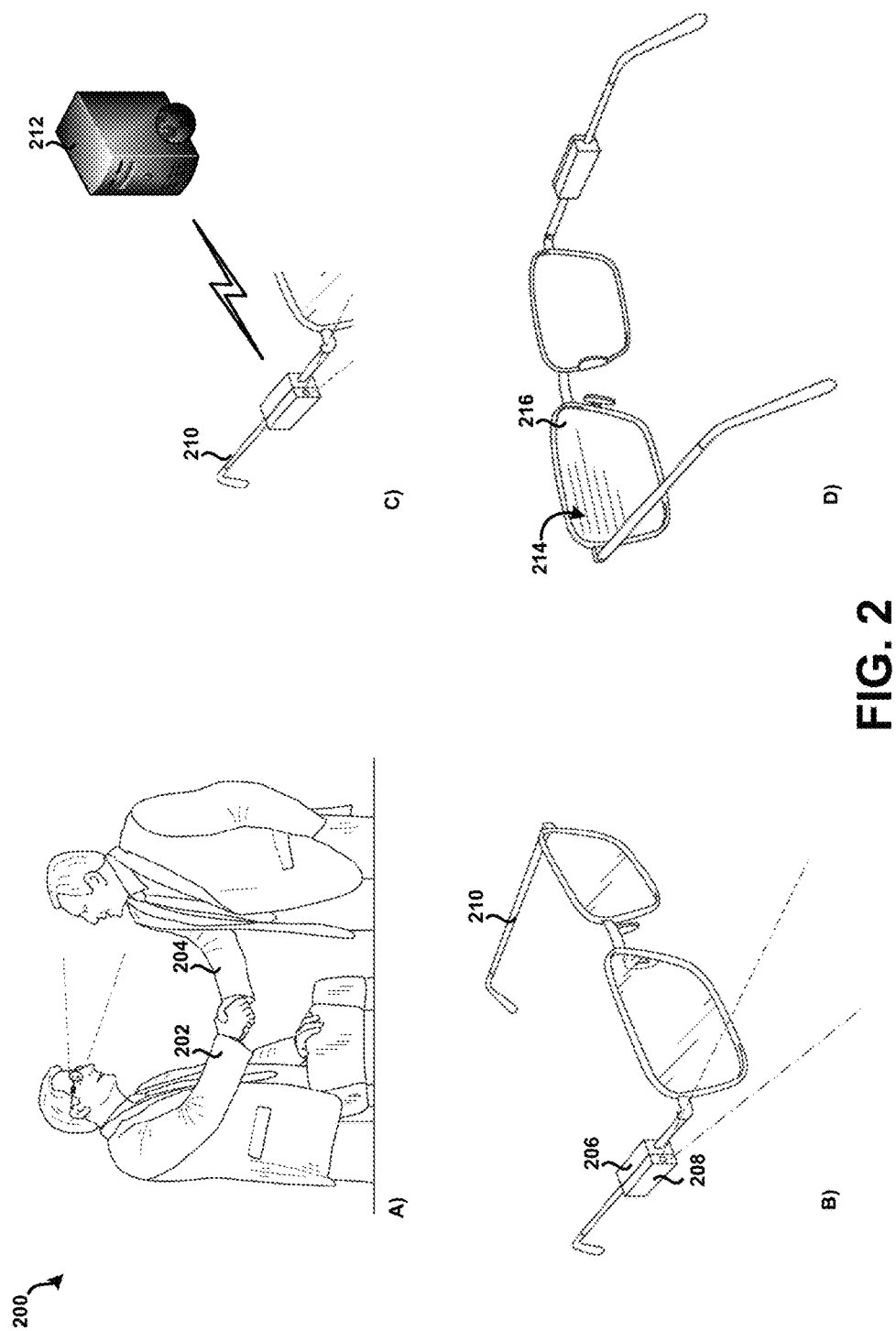
FIG. 2 shows a first example scenario for the presentation of context-sensitive information in accordance with the present disclosure.

For instance, referring now to FIG. 2, a first example scenario 200 for the presentation of context-sensitive information is shown in accordance with the present disclosure. In this example, a first individual 202 is meeting (e.g., slide A) a second individual 204 for the first time at a particular conference having a central topic of "Augmented Reality" for example. A computing device 206 comprising a digital camera 208 may be affixed to or otherwise integrated with a pair of glasses 210 worn by the first individual 202. The digital camera 208 may acquire (e.g., slide A, slide B) an image of the second individual 204 via manual input or actuation by the first individual 202, or via automatic input or actuation by some sensing mechanism of the computing device 206. The computing device 206 may send (e.g., at slide C) the acquired image of the second individual 204 to a delocalized computing system 212. As discussed below in connection with at least FIG. 5, the computing system 212 may query a plurality of resources to acquire information about the second individual 204, organize acquired information about the second individual 204 based on certain situational context, which in this case may be related to the particular conference, and send or return the organized information to the computing device 206. The computing device 206 may discreetly present (e.g., slide D) the organized information to the first individual 202. In FIG. 2, this is depicted as text 214 within or on an interior of left lens 216 of the pair of glasses 210. Other embodiments are possible.

Such an implementation as discussed in connection with the first example scenario 200 may be beneficial and/or advantageous in many respects. For example, the first individual 202 may, in substantially real-time, be presented with various context-sensitive information about the second individual 204, so as to be as fully prepared as possible to engage in a meaningful and productive conversation with the second individual 204. For example, the first individual 202 may be presented with information indicating that the first individual 202 had previously met the second individual 204 at another previous conference the year before for example, that the second individual 204 is an expert in the field of augmented reality, is the chief executive officer of a new company developing augmented reality-related technologies, prefers scotch over whiskey, has two children one of which was just accepted to Harvard University, and so on. Such information may facilitate a more engaging and productive conversation. For example, when the encounter is more of a social interaction, the first individual 202 may bring up pastime-related topics that are of interest to both the first individual 202 and the second individual 204. In another example, when the encounter is more of a business interaction, such as when the first individual 202 is a salesman, the first individual 202 may start the conversation by bringing up recent business topics that may be of interest to the second individual 204. Still other benefits and/or advantages are possible as well.

Figure 3:
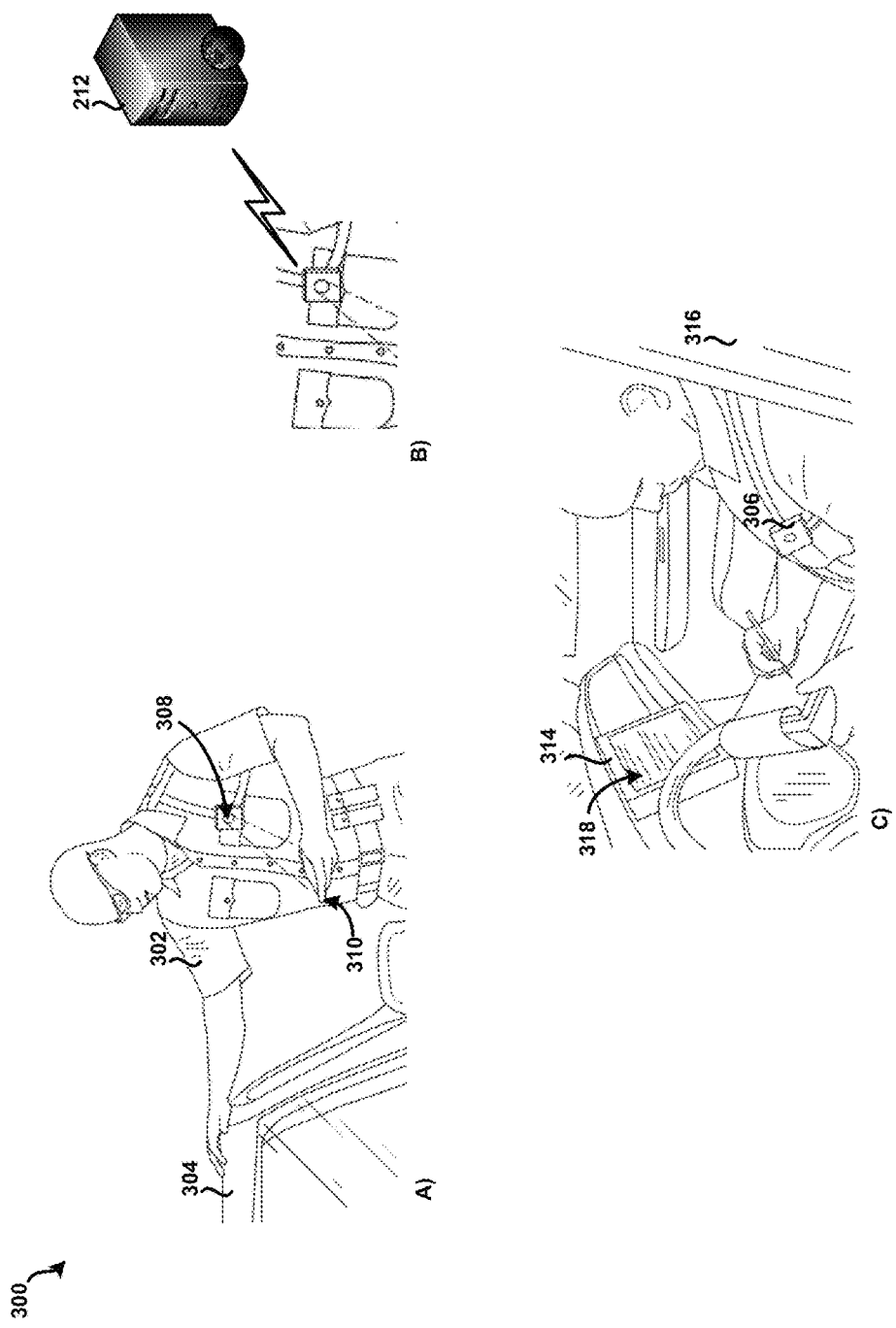
FIG. 3 shows a second example scenario for the presentation of context-sensitive information in accordance with the present disclosure.

Referring now to FIG. 3, a second example scenario 300 for the presentation of context-sensitive information is shown in accordance with the present disclosure. In this example, a police officer 302 is questioning (e.g., slide A) a motorist within a vehicle 304 regarding a moving violation. Here, a computing device 306 comprising a digital camera 308 may be affixed to or otherwise integrated with particular equipment worn by the police officer 302. The digital camera 308 may acquire (e.g., slide A) an image of a driver's license 310 of the motorist via manual input or actuation by the police officer 302, or via automatic input or actuation by some sensing mechanism of the computing device 306. The computing device 306 may send (e.g., slide B) the acquired image of the driver's license 310 to a computing system 212. As discussed further below in connection with at least FIG. 5, the computing system 212 may query a plurality of resources to acquire information about the motorist, organize acquired information based on certain situational context, which in this case may be related to a potential law violation, and send the organized information to another computing device 314 located within a squad car 316 of the police officer 302. The computing device 314 may present (e.g., slide C) the organized information to the police officer 302. In FIG. 3, this is depicted as text 318 displayed by the computing device 314. Other embodiments are possible.

For example, it is contemplated that other information may be captured by the digital camera 308 or other similar device, such as a similar device mounted to the squad car 316. For example, instead of capturing an image of the driver's license 310 of the motorist, the police officer 302 may choose to capture an image of a license plate of the vehicle 304 using a camera mounted to the dashboard of the vehicle 304 while still seated within the squad car 316 for example. Here, various information may be presented by one or both of the computing device 306 and the computing device 314 similar to that described above. Still other embodiments are possible.

Such an implementation as discussed in connection with the second example scenario 300 may be beneficial and/or advantageous in many respects. For example, the police officer 302 may, in substantially real-time, be presented with various context-sensitive information about the motorist, so as to be as fully prepared as possible to engage in investigation of the moving violation. For example, the police officer 302 may be presented with information related to the driving and/or criminal history of the motorist. Additionally or alternatively, the police officer 302 may be presented with various information related to the vehicle 304. Further, in some embodiments when an image of a license plate of the vehicle 304 is captured while the police officer 302 is still seated within the squad car 316, the police officer 302 may acquire information about the motorist and/or vehicle 304 without having to approach the motorist, which may be of benefit when safety of the police officer 302 is of concern. Still other benefits and/or advantages are possible as well.

Figure 4:
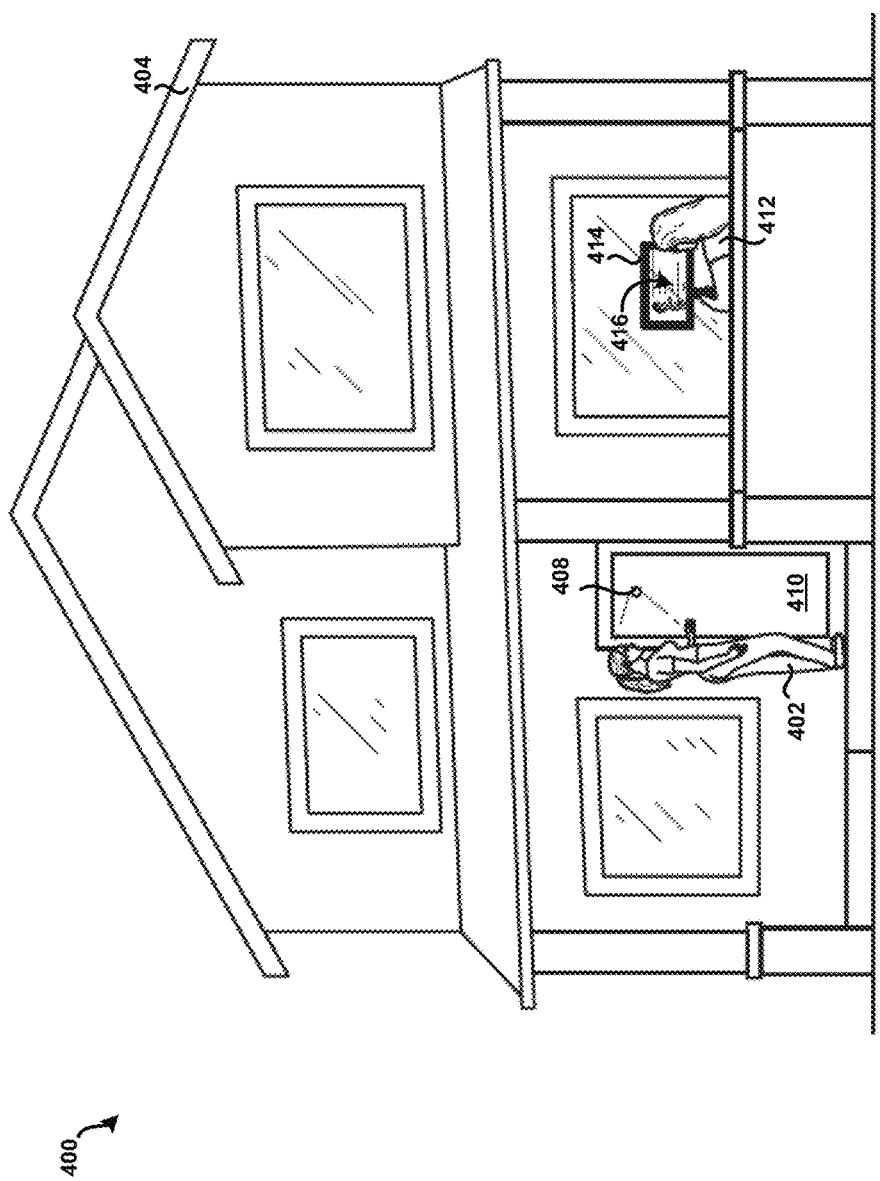
FIG. 4 shows a third example scenario for the presentation of context-sensitive information in accordance with the present disclosure.

Referring now to FIG. 4, a third example scenario 400 for the presentation of context-sensitive information is shown in accordance with the present disclosure. In this example, a first individual 402 is approaching a residence 404. Here, a computing device 406 (not shown) comprising a digital camera 408 may be affixed to or otherwise integrated with particular feature of the residence 404, such as a front door 410 for example as shown in FIG. 4. Although not explicitly shown in FIG. 4, the computing device 406 may be configured in a manner similar to the computing device 306 discussed above in connection with FIG. 3. The digital camera 408 may acquire an image of the first individual 402 via manual input or actuation by a second individual 412 located within or inside the residence 404, or via automatic input or actuation by some sensing mechanism of the digital camera 408. The digital camera 408 may send the acquired image of the first individual 402 to a computing system 212 (see e.g., FIG. 2). As discussed further below in connection with at least FIG. 5, the computing system 212 may query a plurality of resources to acquire information about the first individual 402, organize acquired information based on certain situational context, which in this case may be related to a security issue, and send the organized information to another computing device 414 located within the residence 404. The computing device 414 may present the organized information to the second individual 412. In FIG. 4, this is depicted as text 416 displayed by the computing device 414. Still other embodiments are possible.

For example, it is contemplated that the delocalized computing system or server may send the organized information to any type computing device located within the residence 404, or otherwise located away or remote from the residence 404. For example, the delocalized computing system or server may send the organized information to a smartphone of the second individual 412. Here, the second individual 410 may be notified of someone approaching the residence 404 even when the second individual 410 is away from the residence 404. Still other embodiments are possible.

Such an implementation as discussed in connection with the third example scenario 400 may be beneficial and/or advantageous in many respects. For example, the second individual 410 may, in substantially real-time, be presented with various context-sensitive information about someone or something is approaching the residence 404, so as to be as fully prepared as possible to prepare for any possible security concerns that may be presented by the someone or something. For example, the first individual 402 may be posing as a courier or delivery person with the intention of causing harm to the second individual 410, or unlawfully entering the residence 404. Further, in some embodiments when the second individual 410 is away from the residence 404, the second individual 410 may still be notified of someone or something approaching the residence 404, which may be of benefit for example when a minor such as a child of the second individual 410 is home alone at the residence 404. Still other benefits and/or advantages are possible as well.

Figure 5:
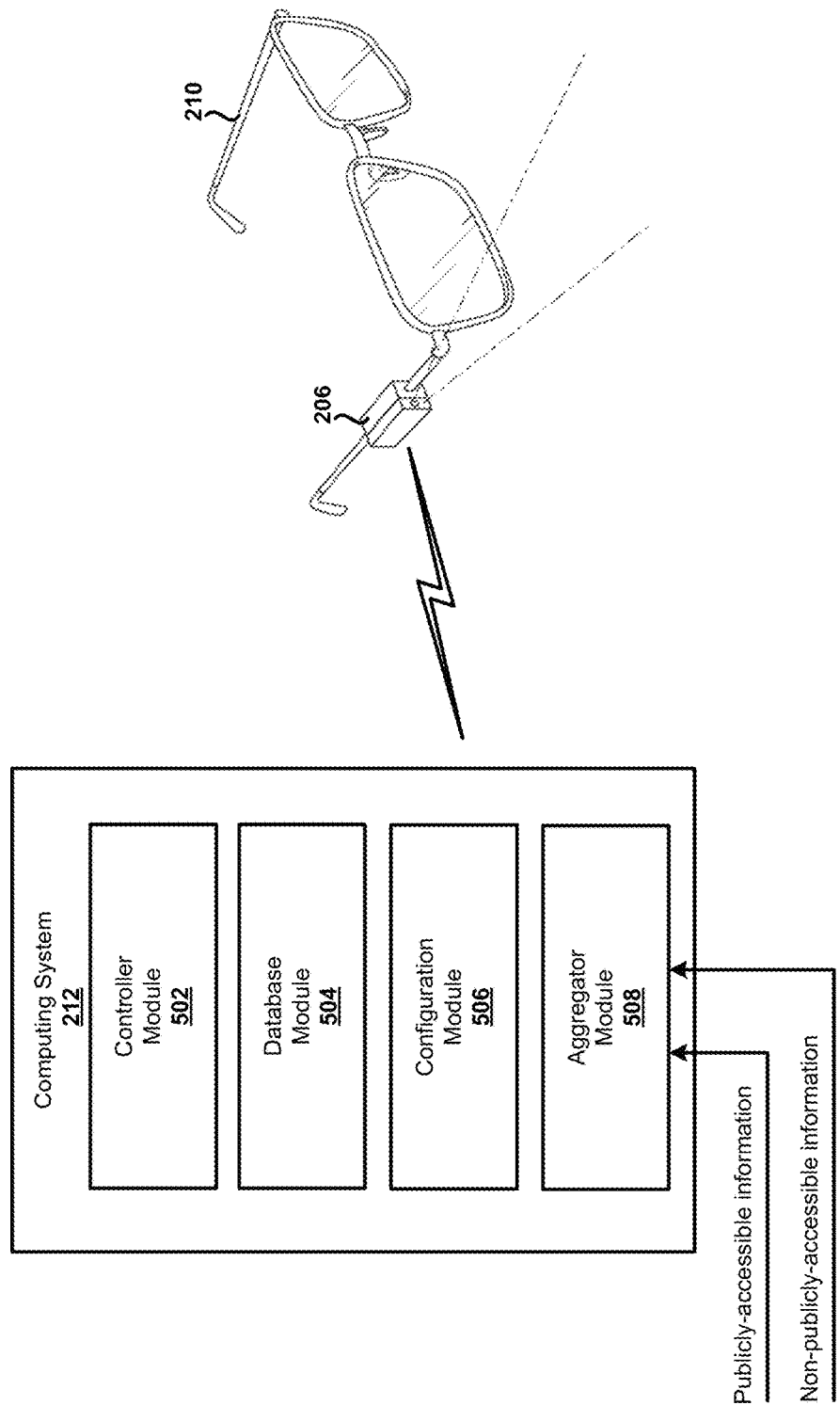
FIG. 5 shows an example networked architecture in accordance with the present disclosure.

Referring now to FIG. 5, an example networked architecture 500 is shown in accordance with the present disclosure. More specifically, FIG. 5 shows the pair of glasses 210 of FIG. 2, and the computing system 212 of FIGS. 2-4. Other embodiments than those depicted in FIG. 5 are possible. For example, in some embodiments, the computing device 306 of FIG. 3 may substitute for the pair of glasses 210 as shown in FIG. 5. In other embodiments, the computing device 406 of FIG. 4 may substitute for the pair of glasses 210 as shown in FIG. 5. In this manner, the following discussion in connection with FIG. 5 may at least be applicable to each of the example scenarios discussed above on connection with FIGS. 2-4. Still other embodiments are possible.

The computing system 212 as shown in FIG. 5 may include a controller module 502, a database module 504, a configuration module 506, and an aggregator module 508. In practice, the controller module 502 of the computing system 212 may be configured to receive from the computing device 206 of the pair of glasses 210 information that distinguishes a particular individual from other individuals. The controller module 502 may further be configured to activate the aggregator module 508, which itself may be configured to query a plurality of resources to acquire information about the particular individual. The query may at least in part be based upon configuration information as contained within the configuration module 506, and may generally result in acquisition of one or both of publicly-accessible information from one or more publicly-accessible resources and non-publicly-accessible information from one or more non-publicly-accessible resources.

In this example, the aggregator module 508 may further be configured to store information acquired from the one or more of the publicly-accessible resources and the non-publicly-accessible resources to the database module 504. In turn, the controller module 502 may further be configured to access this information as stored within the database module 504, and possibly other information relevant to the initial query from the computing device 206 for information associated with the particular individual, and organize such information according to or based on certain situational context. The controller module 502 may further be configured to send the organized information to the computing device 206 of the pair of glasses 210 for presentation thereon.

As mentioned above in connection with FIG. 5, the controller module 502 may at least be configured to activate the aggregator module 508, which itself may be configured to query a plurality of resources to acquire information about the particular individual based upon configuration information as contained within the configuration module 506. In general, the configuration module 506 may include one or more settings or parameters that may be defined by a particular computing device user, such as for example the first individual 202 of FIG. 2, who may be an owner or at least in possession of the pair of glasses 210 as discussed above in the first example scenario 200. An example of one or more settings or parameters may include preferred publicly-accessible resources and non-publicly-accessible resources to be used for searching for information about a particular individual.

An example of preferred publicly-accessible resources may include one or more online social networks, one or more online government resources, one or more online scholarly resources, one or more online educational instructional resources, etc. Here, a priority may be assigned to the preferred publicly-accessible resources. For example, a "high" or "top" priority may be assigned to online social networks, and a "low" or "lowest" priority may be assigned to online government resources. Other embodiments are possible. An example of preferred non-publicly-accessible resources may include resources that require authentication such as one or more online personal electronic mail accounts, one or more personal calendars, one or more personal contacts list, one or more personal task lists, one or more other databases or resources that require authentication such as username/password information, etc. Here, a priority may be assigned to the preferred non-publicly-accessible resources. For example, a "high" or "top" priority may be assigned to personal electronic mail accounts, and a "low" or "lowest" priority may be assigned to personal task lists. Other embodiments are possible. Further, a priority may be assigned to determine whether non-publicly-accessible resources are preferred, or publicly-accessible resources are preferred. For example, a "high" or "top" priority may be assigned to non-publicly-accessible resources, and a "low" or "lowest" priority may be assigned to publicly-accessible resources. Still many other embodiments are possible in accordance with the features or aspects of the present disclosure.

Figure 6:
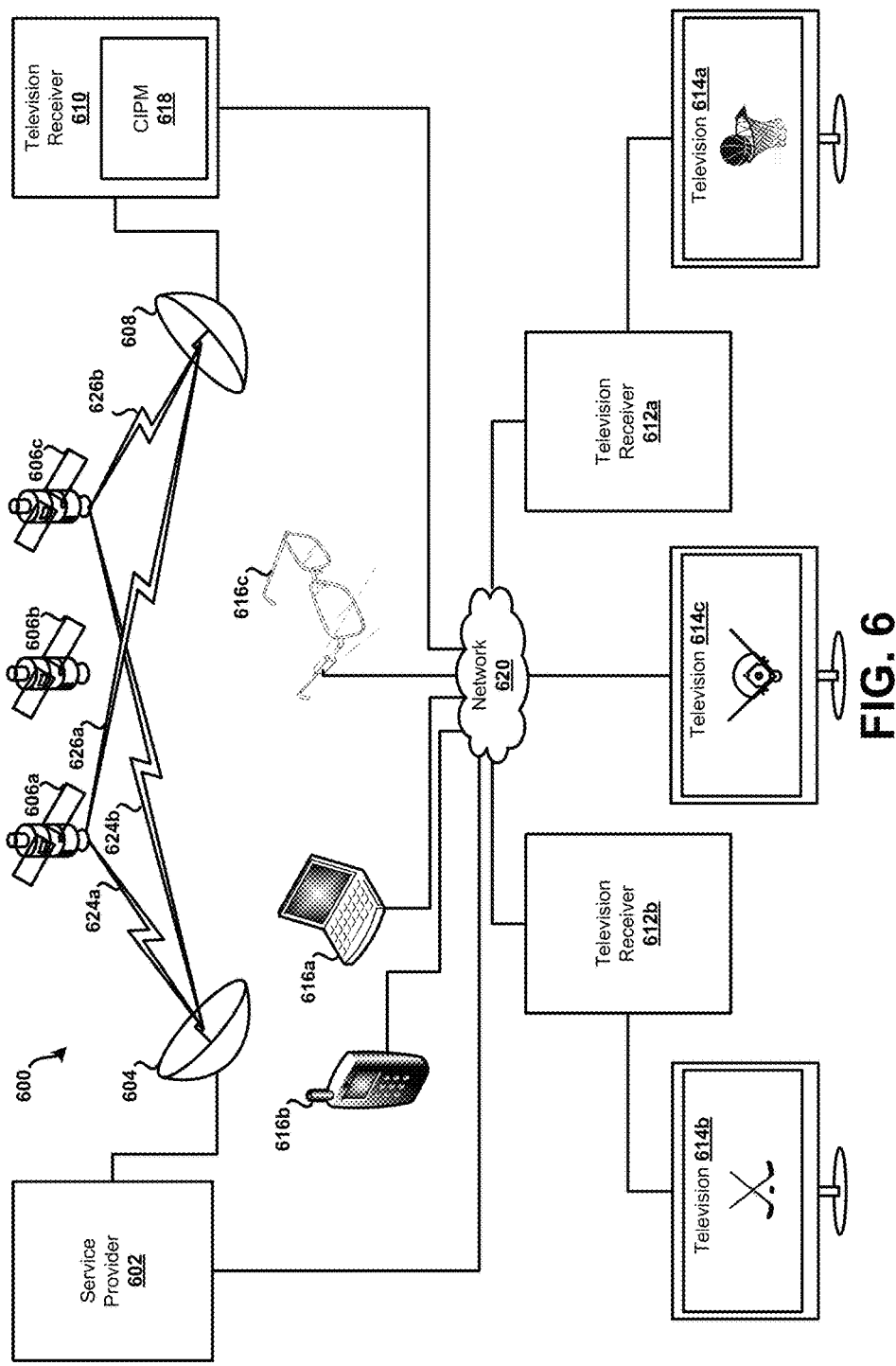
FIG. 6 shows an example media content distribution system in which aspects of the present disclosure may be implemented.

For instance, referring now to FIG. 6 an example media content distribution system 600 is shown in which aspects of the present disclosure may be implemented. For brevity, the system 600 is depicted in a simplified and conceptual form, and may generally include more or fewer systems, devices, networks, and/or other components as desired. Further, number and type of features or elements incorporated within the system 600 may or may not be implementation-specific, and at least some of the aspects of the system 600 may be similar to a cable television distribution system, an IPTV (Internet Protocol Television) content distribution system, and/or any other type of media or content distribution system.

The example system 600 may include a service provider 602, a satellite uplink 604, a plurality of orbiting (e.g., geosynchronous) satellites 606a-c, a satellite dish 608, a PTR (Primary Television Receiver) 610, a plurality of STRs (Secondary Television Receivers) 612a-b, a plurality of televisions 614a-c, and a plurality of computing devices 616a-c. In the present example, the PTR 610 may include a CIPM (Context-sensitive Information Presentation) module 618. The CIPM 618 may in one aspect be configured to implement or otherwise provide a mechanism for a computer user to seamlessly and readily access information in accordance with the present disclosure, as discussed in further detail below.

The system 600 may also include at least one network 620 that establishes a bi-directional communication path for data transfer between and among the PTR 610, STRs 612a-b, televisions 614a-c, and computing devices 616a-c of the example system 600. The network 620 may further establish a bi-directional communication path for data transfer between the PTR 610 and the service provider 602. The network 620 is intended to represent any number of terrestrial and/or non-terrestrial network features or elements. For example, the network 620 may incorporate or exhibit any number of features or elements of various wireless and/or hardwired packet-based communication networks such as, for example, a WAN (Wide Area Network) network, a HAN (Home Area Network) network, a LAN (Local Area Network) network, a WLAN (Wireless Local Area Network) network, the Internet, a cellular communications network, or any other type of communication network configured such that data may be transferred between and among respective elements of the example system 600.

The PTR 610, and the STRs 612a-b, as described throughout may generally be any type of television receiver, such as a STB (Set-Top-Box) for example. In another example, the PTR 610, and the STRs 612a-b, may exhibit functionality integrated as part of or into a television, a DVR, a computer such as a tablet computing device, or any other computing system or device, as well as variations thereof. Further, the PTR 610 and the network 620, together with the STRs 612a-b and televisions 614a-c, and possibly the computing devices 616a-c, may form at least a portion of a particular home computing network, and may each be respectively configured so as to enable communications in accordance with any particular communication protocol(s) and/or standard(s) including, for example, TCP/IP (Transmission Control Protocol/Internet Protocol), DLNA/DTCP-IP (Digital Living Network Alliance/Digital Transmission Copy Protection over Internet Protocol), HDMI/HDCP (High-Definition Multimedia Interface/High-bandwidth Digital Content Protection), etc. Other embodiments are possible. For example, one or more of the various elements or components of the example system 600 may be configured to communicate in accordance with the MoCA® (Multimedia over Coax Alliance) home entertainment networking standard. Still Other embodiments are possible.

In practice, the satellites 606a-c may each be configured to receive uplink signals 624a-b from the satellite uplink 604. In this example, the uplink signals 624a-b may contain one or more transponder streams of particular data or content, such as particular television channel, that is supplied by the service provider 602. For example, each of the respective uplink signals 624a-b may contain various media content such a plurality of encoded HD (High Definition) television channels, various SD (Standard Definition) television channels, on-demand programming, programming information, and/or any other content in the form of at least one transponder stream, and in accordance with an allotted carrier frequency and bandwidth. In this example, different media content may be carried using different ones of the satellites 606a-c. Further, different media content may be carried using different transponders of a particular satellite (e.g., satellite 606a); thus, such media content may be transmitted at different frequencies and/or different frequency ranges. For example, a first and second television channel may be carried on a first carrier frequency over a first transponder of satellite 606a, and a third, fourth, and fifth television channel may be carried on second carrier frequency over a first transponder of satellite 606b, or, the third, fourth, and fifth television channel may be carried on a second carrier frequency over a second transponder of satellite 606a, etc.

The satellites 606a-c may further be configured to relay the uplink signals 624a-b to the satellite dish 608 as downlink signals 626a-b. Similar to the uplink signals 624a-b, each of the downlink signals 626a-b may contain one or more transponder streams of particular data or content, such as various encoded and/or at least partially electronically scrambled television channels, on-demand programming, etc., in accordance with an allotted carrier frequency and bandwidth. The downlink signals 626a-b, however, may not necessarily contain the same or similar content as a corresponding one of the uplink signals 624a-b. For example, the uplink signal 624a may include a first transponder stream containing at least a first group or grouping of television channels, and the downlink signal 626a may include a second transponder stream containing at least a second, different group or grouping of television channels. In other examples, the first and second group of television channels may have one or more television channels in common. In sum, there may be varying degrees of correlation between the uplink signals 624a-b and the downlink signals 626a-b, both in terms of content and underlying characteristics.

Continuing with the example implementation scenario, the satellite dish 608 may be provided for use to receive television channels (e.g., on a subscription basis) provided by the service provider 602, satellite uplink 604, and/or satellites 606a-c. For example, the satellite dish 608 may be configured to receive particular transponder streams, or downlink signals 626a-b, from one or more of the satellites 606a-c. Based on the characteristics of the PTR 610 and/or satellite dish 608, however, it may only be possible to capture transponder streams from a limited number of transponders concurrently. For example, a tuner of the PTR 610 may be configured to tune to a single transponder stream from a transponder of a single satellite at a time.

Additionally, the PTR 610, which is communicatively coupled to the satellite dish 608, may subsequently select via tuner, decode, and relay particular transponder streams to the television 614c for display thereon. For example, the satellite dish 608 and the PTR 610 may, respectively, be configured to receive, decode, and relay at least one premium HD-formatted television channel to the television 614c. Programming or content associated with the HD channel may generally be presented "live," or from a recording as previously stored on, by, or at the PTR 610. In this example, the HD channel may be output to the television 614c in accordance with the HDMI/HDCP content protection technologies. Other embodiments are possible. For example, in some embodiments, the HD channel may be output to the television 614c in accordance with the MoCA® (Multimedia over Coax Alliance) home entertainment networking standard. Still other embodiments are possible.

Further, the PTR 610 may select via tuner, decode, and relay particular transponder streams to one or both of the STRs 612*a-b*, which may in turn relay particular transponder streams to a corresponding one of the television 614*a* and the television 614*a* for display thereon. For example, the satellite dish 608 and the PTR 610 may, respectively, be configured to receive, decode, and relay at least one television channel to the television 614*a* by way of the STR 612*a*. Similar to the above-example, the television channel may generally be presented "live," or from a recording as previously stored on the PTR 610, and may be output to the television 614*a* by way of the STR 612*a* in accordance with a particular content protection technology and/or networking standard. Other embodiments are possible.

Still further, the satellite dish 608 and the PTR 610 may, respectively, be configured to receive, decode, and relay at least one premium television channel to one or both of the computing devices 616*a-b*. Similar to the above-examples, the television channel may generally be presented "live," or from a recording as previously stored on the PTR 610, and may be output to one or both of the computing devices 616*a-b* in accordance with a particular content protection technology and/or networking standard. Other embodiments are possible.

Figure 7:
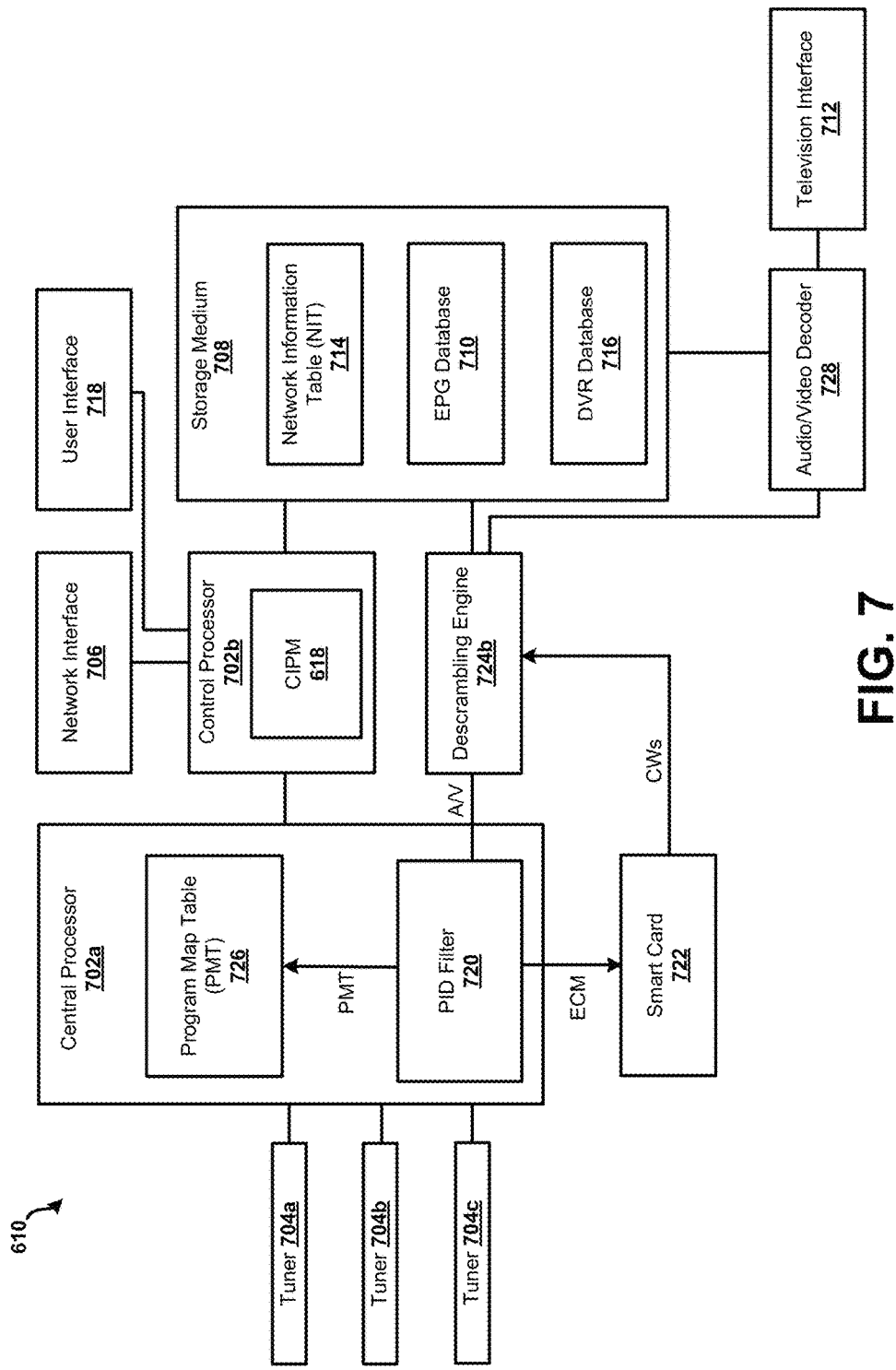
FIG. 7 shows an example block diagram of a television receiver of FIG. 6.

Referring now to FIG. 7, a simplified block diagram of the PTR 610 of FIG. 6 is shown in accordance with the present disclosure. In some embodiments, at least one of the STRs 612*a-b* may be configured in a manner similar to that of the PTR 610. In other embodiments, at least one of the STRs 612*a-b* may be configured to exhibit a reduced functionality as compared to the PTR 610, and may depend at least to a certain degree on the PTR 610 to implement certain features or functionality. In this example, the STRs 612*a-b* may be referred to as a "thin client."

For brevity, the PTR 610 is depicted in a simplified and conceptual form, and may generally include more or fewer elements or components as desired in accordance with the present disclosure. For example, the PTR 610 is shown in FIG. 7 to include CIPM 618 as mentioned above in connection with FIG. 6. Additionally, although not explicitly shown in FIG. 7, the PTR 610 may include one or more logical modules configured to implement a television steaming media functionality that encodes video into a particular format for transmission over the Internet such as to allow users to remotely view and control a home cable, satellite, or personal video recorder system from an Internet-enabled computer with a broadband Internet connection. The Slingbox® by Sling Media, Inc. of Foster City, Calif., is one example of a product that implements such a functionality. Additionally, the PTR 610 may be configured to include any number of other various components or logical modules that are implemented in hardware, software, firmware, or any combination thereof, and such components or logical modules may or may not be implementation-specific.

In some embodiments, the PTR 610 and/or the STRs 612*a-b* comprises of a STB. In addition to being in the form of an STB, at least the PTR 610 may be incorporated into another device, such as the television 614*c* as shown in FIG. 2. For example, the television 614*c* may have an integrated television receiver that does not involve an external STB being coupled with the television 614*c*. A STB may contain some or all of the components of the PTR 610 and/or may be able to perform some or all of the functions of the PTR 610. Accordingly, instances in this document referring to a STB, and steps being performed by a STB, may also be performed, more generally, by the PTR 610 and/or STRs 612*a-b*.

Referring still to FIG. 7, the PTR 610 may include at least one processor 702, including a central processor 702*a* and a control processor 702*b*, a plurality of tuners 704*a-c*, at least one network interface 706, at least one non-transitory computer-readable storage medium 708, at least one EPG database 710, at least one television interface 712, at least one NIT (Networking Information Table) 714, at least one DVR database 716, at least one user interface 718, at least one PID filter 720, at least one smart card 722, at least one descrambling engine 724, at least one PMT (Program Map Table) 726, and at least one decoder 728. In other embodiments of the PTR 610, fewer or greater numbers of components may be present. Further, functionality of one or more components may be combined; for example, functions of the descrambling engine 724 may be performed by the central processor 702*a*. Still further, functionality of components may be spread among additional components. For example, the PID filter 720 may be handled by hardware and/or software separate from the PMT 726.

The processor 702 may include one or more specialized and/or general-purpose processors configured to perform processes such as tuning to a particular channel, accessing and displaying EPG information from the EPG database 710, and/or receiving and processing input from a user. For example, processor 702 may include one or more processors dedicated to decoding video signals from a particular format, such as MPEG, for output and display on a television and for performing decryption.

The control processor 702*b* may communicate with the central processor 702*a*. The control processor 702*b* may control the recording of television channels based on timers stored in the DVR database 716. The control processor 702*b* may initiate recording of a television channel by sending a record command along with an indication of the television channel to be recorded to the central processor 702*a*. The control processor 702*b* may not send a second record command, when additional recording is to begin at the same time, until an acknowledgement that recording of the first television channel has successfully been received and initiated by the central processor 702*a*. The control processor 702*b* may also provide commands to the central processor 702*a* when recording of a television channel is to cease. In addition to providing commands relating to the recording of television channels, the control processor 702*b* may provide commands to the central processor 702*a* that indicate television channels to be output to the decoder 728 for output to a presentation device, such as the television 614*c* for example.

The control processor 702*b* may also communicate with the network interface 706 and the user interface 718. The control processor 702*b* may handle in-coming data from the network interface 706 and the user interface 718. Additionally, the control processor 702*b* may be configured to output data via the network interface 706.

The tuners 704*a-c* may be used to tune to television channels, such as television channels transmitted via satellite or cable, such as satellites 606*a-c*. Each respective one of the tuner 704*a-c* may be capable of receiving and processing a single stream of data from a satellite transponder, or a cable RF channel, at a given time. As such, a single tuner may tune to a single transponder or, for a cable network, a single cable RF channel. Additionally, one tuner (e.g., tuner 704*a*) may be used to tune to a television channel on a first transponder stream for display using a television, while another tuner (e.g., tuner 704*b*) may be used to tune to a television channel on a second transponder for recording and viewing at some other time. Still another tuner (e.g., tuner 704c) may be used to check various television channels to determine if they are available or not. If multiple television channels transmitted on the same transponder stream are desired, a particular tuner (e.g., tuner 704a) may be used to receive the signal containing the multiple television channels for presentation and/or recording. The tuners 704a-c may receive commands from the central processor 702a. Such commands may instruct the tuners 704a-c which frequencies are to be used for tuning.

The network interface 706 may be used to communicate via an alternate communication channel with a television service provider. For example, the primary communication channel may be via satellite, which may be unidirectional to the STB, and the alternate communication channel, which may be bidirectional, may be via a network, such as the Internet. The PTR 610 may be able to communicate with the service provider 602 of FIG. 3 via a network, such as the Internet. This communication may be bidirectional. For example, data may be transmitted from the PTR 610 to the service provider 602, and from the service provider 602 to the PTR 610. The network interface 706 may be configured to communicate via one or more networks, such as the Internet, to communicate with the service provider 602. Information may be transmitted and/or received via the network interface 706.

The storage medium 708 may represent a non-transitory computer-readable storage medium. The storage medium 708 may include memory and/or a hard drive. The storage medium 708 may be used to store information received from one or more satellites and/or information received via the network interface 706. The storage medium 708 may store information related to the EPG database 710, the NIT 714, and/or the DVR database 716. Recorded television programs may be stored using the storage medium 708. The storage medium 708 may be partitioned or otherwise divided such that predefined amounts of the storage medium 708 are devoted to storage of omnibus channel files and user-selected television programs.

The EPG database 710 may store information related to television channels and the timing of programs appearing on such television channels. The EPG database 710 may be stored using the storage medium 708, which may be a hard drive. Information from the EPG database 710 may be used to inform users of what television channels or programs are popular and/or provide recommendations to the user. Information from the EPG database 710 may provide the user with a visual interface displayed by a television that allows a user to browse and select television channels and/or television programs for viewing and/or recording. Information used to populate the EPG database 710 may be received via the network interface 706 and/or via satellites, such as satellites 606a-c of FIG. 6 via the tuners 704a-c. For instance, updates to the EPG database 710 may be received periodically via satellite. The EPG database 710 may serve as an interface for a user to control DVR functions of the PTR 610, and/or to enable viewing and/or recording of multiple television channels simultaneously.

In addition to being used to provide users with information about scheduled programming, information from the EPG database 710 may be used to determine when television programs begin and end for the purposes of recording. For instance, when a channel-specific file is recorded that contains multiple television channels, the start and end of time of specific television programs within the channel-specific file may be based on the start and end times indicated in the EPG database 710. Other data may be stored within the EPG database 710 that may be useful in managing channel-specific files, such as series identifiers and episode identifiers, which may be used by a television service provider to identify particular television programs.

The decoder 728 may serve to convert encoded video and audio into a format suitable for output to a display device. For instance, the decoder 728 may receive MPEG video and audio from the storage medium 708, or the descrambling engine 724, to be output to a television. MPEG video and audio from the storage medium 708 may have been recorded to the DVR database 716 as part of a previously-recorded television program. The decoder 728 may convert the MPEG video and audio into a format appropriate to be displayed by a television or other form of display device and audio into a format appropriate to be output from speakers, respectively.

The television interface 712 may serve to output a signal to a television, or another form of display device, in a proper format for display of video and playback of audio. As such, the television interface 712 may output one or more television channels, stored television programming from the storage medium 708, such as television programs from the DVR database 716 and/or information from the EPG database 710 for example, to a television for presentation.

The NIT 714 may store information used by the PTR 610 to access various television channels. The NIT 714 may be stored using the storage medium 708. Information used to populate the NIT 714 may be received via satellite, or cable, via the tuners 704a-c and/or may be received via the network interface 706 from a service provider. As such, information present in the NIT 714 may be periodically updated. The NIT 714 may be locally-stored by the PTR 610 using the storage medium 708. Information that may be present in the NIT 714 may include, for example: television channel numbers, a satellite identifier, a frequency identifier, a transponder identifier, an ECM (Entitlement Control Message) PID (Packet Identifier), one or more audio PIDs, and a video PID. A second audio PID of a channel may correspond to a SAP (Second Audio Program) program, such as in another language. In some embodiments, the NIT 714 may be divided into additional tables. For example, rather than the specific audio PIDs and video PIDs being present in the NIT 714, a channel identifier may be present within NIT 714 which may be used to look up the audio PIDs and video PIDs in another table, such as the PMT 726. For example, the PMT 726 may store information on audio PIDs and video PIDs for television channels that are transmitted on a transponder frequency.

Table 1 provides a simplified example of the NIT 714 for several television channels. It should be understood that in other embodiments, many more television channels may be represented in the NIT 714. The NIT 714 may be at least periodically updated by a television service provider. As such, television channels may be reassigned to different satellites and/or transponders, and the PTR 610 may be able to handle this reassignment as long as the NIT 714 is updated.

TABLE 1

| Channel | Satellite | Transponder | ECM PID | PMT PID |
|---------|-----------|-------------|---------|---------|
| 4 | 1 | 2 | 27 | 1001 |
| 5 | 2 | 11 | 29 | 1002 |
| 7 | 2 | 3 | 31 | 1001 |
| 13 | 2 | 4 | 33 | 1004 |

Based on information in the NIT 714, it may be possible to determine the proper satellite and transponder to which to tune for a particular television channel. In some embodiments, the NIT 714 may list a particular frequency to which to tune for a particular television channel. Once tuned to the proper satellite/transponder/frequency, the PMT PID may be used to retrieve a program management table that indicates the PIDs for audio and video streams of television channels transmitted by that transponder.

It should be understood that the values provided in Table 1 are for example purposes only. Actual values, including how satellites and transponders are identified, may vary. Additional information may also be stored in NIT 714. The same PID may be reused on different transponders.

A DVR may permit a television channel to be recorded for a period of time. DVR functionality of the PTR 610 may be managed by the control processor 702*b*. The control processor 702*b* may coordinate the television channel, start time, and stop time of when recording of a television channel is to occur. The DVR database 716 may store information related to the recording of television stations. The DVR database 716 may store timers that are used by the control processor 702*b* to determine when a television channel should be tuned to and its programs recorded to the DVR database 716. However, other embodiments are possible. For example, in some embodiments, the storage medium 708 may store timers. Timer files may be defined as a daily_schedule_db.dat file and a gloal_timer_db.dat file. In general, when a "new" timer is created, a "new" entry may be added into the daily_schedule_db.dat and gloal_timer_db.dat files, which may include all timer related information such as channel number, start time, duration, etc. Further, a limited amount of the storage medium 708 may be devoted to the DVR database 716. Timers may be set by a service provider and/or one or more users of the PTR 610.

DVR functionality of the control processor 702*b* may have multiple modes. For example, DVR functionality of the control processor 702*b* may be configured to record individual television programs selected by a user to the DVR database 716. Using the EPG database 710, a user may select a particular television program. Based on the date, time period, and television channel indicated by the EPG database 710, the control processor 702*b* may record the associated television program to the DVR database 716. In another example, the DVR database 716 may be used to store recordings of predefined periods of time on one or more television channels. These predefined periods of time may include one or more television programs. For example, primetime on a particular television network may be recorded each weekday night. Further, multiple television channels may be recorded for such predefined periods of time. Such recording of television channels for predefined periods of time may be defined by a television service provider (e.g., service provider 602).

As an example of this second mode of DVR functionality, a television service provider may configure the PTR 610 to record television programming on multiple, predefined television channels for a predefined period of time, on predefined dates. For instance, a television service provider may configure the PTR 610 such that television programming may be recorded from 7 PM to 10 PM on the NBC, ABC, CBS, and FOX networks each weeknight. When a television program is selected for recording by a user and is also specified for recording by the television service provider, the user selection may serve as an indication to save the television program for an extended time, beyond the time which the predefined recording would otherwise be saved.

The user interface 718 may include a remote control, physically separate from PTR 610, and/or one or more buttons on the PTR 610 that allows a user to interact with the PTR 610. The user interface 718 may be used to select a television channel for viewing, view information from the EPG database 710, and/or program a timer stored to the DVR database 716 wherein the timer may be used to control the DVR functionality of the control processor 702*b*.

Referring back to tuners 704*a-c*, television channels received via satellite, or cable, may contain at least some scrambled data. Packets of audio and video may be scrambled to prevent unauthorized users, such as nonsubscribers, from receiving television programming without paying the television service provider. When one of the tuners 704*a-c* is receiving data from a particular transponder of a satellite, the transponder stream may be a series of data packets corresponding to multiple television channels. Each data packet may contain a PID, which, in combination with the NIT 714 and/or the PMT 726, may be determined to be associated with particular television channel. Particular data packets, referred to as ECMs may be periodically transmitted. ECMs may be associated with another PID and may be encrypted; the PTR 610 may use the smart card 722 to decrypt ECMs. Decryption of an ECM may only be possible when the user (e.g., PTR 610) has authorization to access the particular television channel associated with the ECM. When an ECM is determined to correspond to a television channel being stored and/or displayed, the ECM may be provided to the smart card 722 for decryption.

When the smart card 722 receives an encrypted ECM, the smart card 722 may decrypt the ECM to obtain some number of control words. In some embodiments, from each ECM received by the smart card 722, two control words are obtained. In some embodiments, when the smart card 722 receives an ECM, it compares the ECM to the previously received ECM. When the two ECMs match, the second ECM is not decrypted because the same control words would be obtained. In other embodiments, each ECM received by the smart card 722 is decrypted; however, when a second ECM matches a first ECM, the outputted control words will match; thus, effectively, the second ECM does not affect the control words output by the smart card 722. The smart card 722 may be permanently part of the PTR 610 or may be configured to be inserted and removed from PTR 610.

The central processor 702*a* may be in communication with the tuners 704*a-c* and the control processor 702*b*. The central processor 702*a* may be configured to receive commands from the control processor 702*b*. Such commands may indicate when to start/stop recording a television channel and/or when to start/stop causing a television channel to be output to a television. The central processor 702*a* may control the tuners 704*a-c*. The central processor 702*a* may provide commands to the tuners 704*a-c* that instruct the tuners which satellite, transponder, and/or frequency to tune to. From the tuners 704*a-c*, the central processor 702*a* may receive transponder streams of packetized data. As previously detailed, some or all of these packets may include a PID that identifies the content of the packet.

The central processor 702*a* may be configured to create at least one PID filter 720 that sorts packets received from the tuners 704*a-c* based on the PIDs. When a tuner is initially tuned to a particular frequency, such as a particular transponder of a satellite, a PID filter may be created based on a PID of PMT data. The PID of PMT data packets may be known because it is stored as part of the NIT 714. From the PMT data packets, the PMT 726 may be constructed by central processor 702*a*.

Table 2 provides an example extract of a PMT. The PMT 726 may be specific to a particular transponder. As such, when tuning to a different transponder occurs, a new PMT may be created for the different transponder.

TABLE 2

| Channel | Video PID | 1$^{st}$ Audio PID | 2$^{nd}$ Audio PID |
|---------|-----------|--------------------|--------------------|
| 4 | 1003 | 2383 | 2119 |
| 5 | 2993 | 2727 | 2728 |
| 7 | 9238 | 1233 | 0129 |
| 13 | 0012 | 9348 | — |

Accordingly, based on the information present in the PMT 726, the audio and video PIDs for specific television channels may be identified. A television channel may have multiple audio PIDs due to a second audio program, which may be in a different language.

The values provided in Table 2 are for example purposes only. Actual values may vary. Additional information or less information may also be stored in the PMT 726.

The PID filter 720 may be configured to filter data packets based on PIDs. In some embodiments, the PID filter 720 is created and executed by central processor 702a. In other embodiments, separate hardware may be used to create and execute multiple PID filters. Depending on a television channel selected for recording/viewing, a PID filter may be created to filter the video and audio packets associated with the television channel, based on the PID assignments present in the PMT 726. For example, when a transponder data stream includes multiple television channels, data packets corresponding to a television channel that is not desired to be stored or displayed by the user, may be ignored by PID filters. As such, only data packets corresponding to the one or more television channels desired to be stored and/or displayed may be filtered and passed to either the descrambling engine 724 or the smart card 722; other data packets may be ignored. For each television channel, a stream of video packets, a stream of audio packets, one or both of the audio programs, and/or a stream of ECM packets may be present, each stream identified by a PID. In some embodiments, a common ECM stream may be used for multiple television channels. Additional data packets corresponding to other information, such as updates to the NIT 714, may be appropriately routed by the PID filter 720. At a given time, one or multiple PID filters may be executed by the central processor 702a.

The descrambling engine 724 may use the control words output by the smart card 722 in order to descramble video and/or audio corresponding to television channels for storage and/or presentation. Video and/or audio data contained in the transponder data stream received by the tuners 704a-c may be scrambled. Video and/or audio data may be descrambled by descrambling engine 724 using a particular control word. Which control word output by the smart card 722 to be used for successful descrambling may be indicated by a scramble control identifier present within the data packet containing the scrambled video or audio. Descrambled video and/or audio may be output by the descrambling engine 724 to the storage medium 708 for storage in the DVR database 716 and/or to the decoder 728 for output to a television or other presentation equipment via the television interface 712.

For simplicity, the PTR 610 of FIG. 7 has been reduced to a block diagram; commonly known parts, such as a power supply, have been omitted. Further, some routing between the various modules of PTR 610 has been illustrated. Such illustrations are for exemplary purposes only. The state of two modules not being directly or indirectly connected does not indicate the modules cannot communicate. Rather, connections between modules of the PTR 610 are intended only to indicate possible common data routing. It should be understood that the modules of the PTR 610 may be combined into a fewer number of modules or divided into a greater number of modules. Further, the components of the PTR 610 may be part of another device, such as built into a television. Also, while the PTR 610 may be used to receive, store, and present television channels received via a satellite, it should be understood that similar components may be used to receive, store, and present television channels via a cable network.

Figure 8:
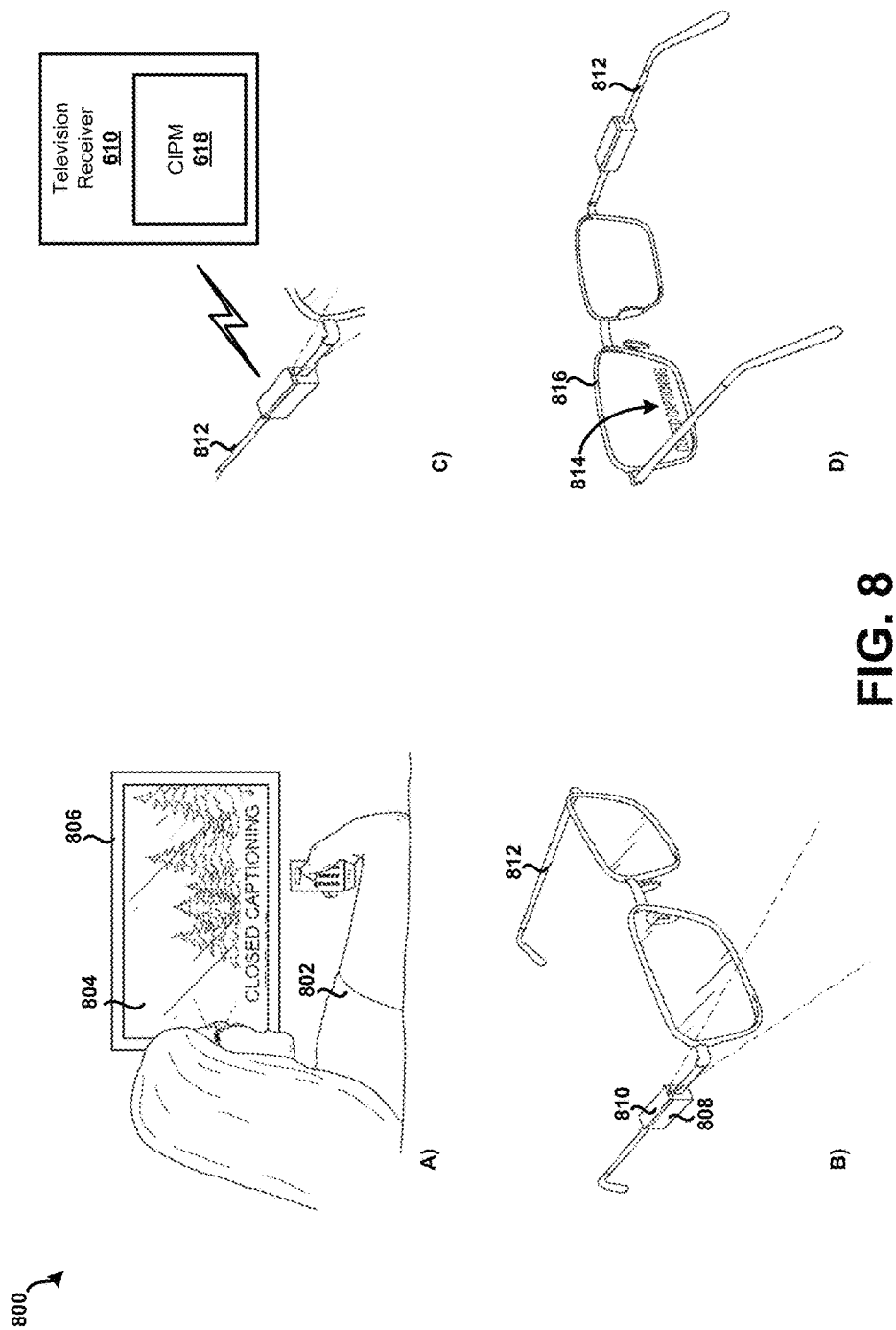
FIG. 8 shows a fourth example scenario for the presentation of context-sensitive information in accordance with the present disclosure.

Referring now to FIG. 8, a fourth example scenario 800 for the presentation of context-sensitive information is shown in accordance with the present disclosure. In this example, an individual 802 is watching (e.g., slide A) a program 804 on a television 806. Here, a computing device 808 comprising a digital camera 810 may be affixed to or otherwise integrated with a pair of glasses 812 worn by the individual 802. The digital camera 810 may acquire (e.g., slide A, at slide B) display of the program 804 via manual input or actuation by the individual 802, or via automatic input or actuation by some sensing mechanism of the computing device 808. The computing device 808 may be in communication (e.g., at slide C) with the CIPM 618 of the PTR 610 so that the computing device 808 and the PTR 610 may be synchronized with respect to timing of the program 804 as displayed by the television 806. Here, the PTR 610 may send, for example, closed-captioning data to the computing device 808, so that the individual 802 may watch the program 804 on the television 806 with closed-captioning as desired. In this example, the computing device 808 may present (e.g., slide D) the closed-captioning data to the individual 802. In FIG. 8, this is depicted as text 814 within or on an interior of left lens 816 of the pair of glasses 812. In this example, the computing device 808 may present the closed-captioning data to the individual 802 so that the closed-captioning "appears" to be positioned on-screen (e.g., slide A) in a suitable non-invasive position. Other embodiments are possible.

Such an implementation as discussed in connection with the fourth example scenario 800 may be beneficial and/or advantageous in many respects. For example, the individual 802 may watch the program 804 on the television 806 with closed-captioning, where the closed-captioning does not interfere or obstruct viewing of the program 804 by other individuals watching the program 804. Further, other embodiments are possible. For example, in some embodiments, the PTR 610 may send "director" or "actor" commentary to the computing device 808, so that the individual 802 may watch the program 804 on the television 806 with such commentary as desired, where the commentary does not interfere or obstruct viewing of the program 804 by other individuals watching the program 804. Many other embodiments, benefits, and/or advantages are possible as well. For example, besides displaying closed caption privately to a user, other data may additionally, or alternately, be presented such as personalized Twitter/Facebook feeds that would enhance or otherwise supplement program viewing.

Figure 9:
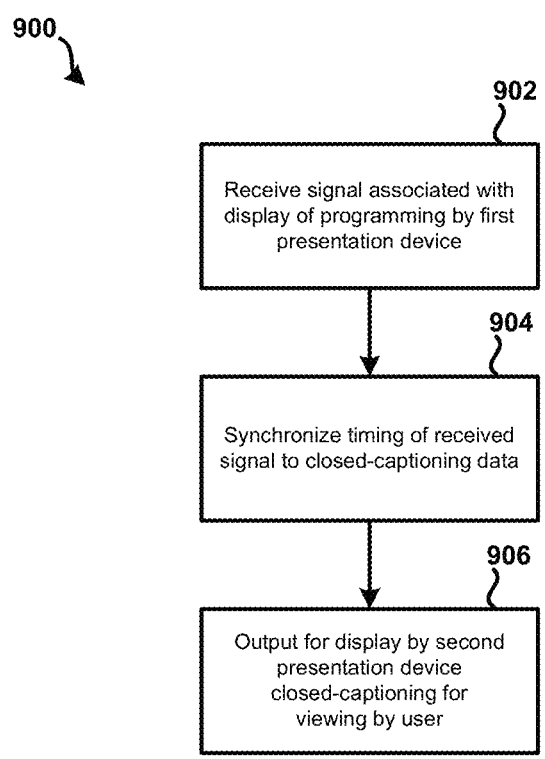
FIG. 9 shows a second example method in accordance with the present disclosure.

Referring now to FIG. 9, a second example method 900 is shown in accordance with the present disclosure. In general, the example method 100 as described may be performed on or by at least one computing system or device in a networked computing environment. An example of such a computing system or device and networked computing environment are discussed above in connection with at least FIG. 5 and FIG. 6. Other embodiments are possible.

At step 902, a computing system may receive a signal from a portable computing device, where the signal may be is associated with the display of programming by a presentation device other than the portable computing device. At step 904, the computing system may synchronize timing of the received signal to, for example, closed-captioning data associated with the programming as displayed. At step 906, the computing system may output for display by the portable computing device, for example, closed-captioning for viewing by a user of the portable computing device.

Such an implementation as discussed in connection with FIG. 9 may be consistent with the fourth example scenario 800 for the presentation of context-sensitive information of FIG. 8. In that example, the individual 802 may use the digital camera 810 of the computing device 808 to acquire display of the program 804 (e.g., step 902). Further, the computing device 808 may be in communication with the CIPM 618 of the PTR 610 so that the computing device 808 and the PTR 610 may be synchronized with respect to timing of the program 804 as displayed by the television 806 (e.g., step 902). Further, the computing device 808 may present the closed-captioning data to the individual 802 as text 814 within or on an interior of left lens 816 of the pair of glasses 812, where the text 814 may be presented or displayed so that the closed-captioning appears to be positioned on-screen of the television 806 in suitable, non-disruptive position. In general, one or more steps or operations of the example method 900 of FIG. 9 may be performed in response to a command. For example, the computing device 808 may be in communication with the CIPM 618 of the PTR 610 so that the computing device 808 and the PTR 610 may be synchronized with respect to timing of the program 804 as displayed by the television 806 (e.g., step 902) in response to a command or input provided by the individual 802. Other embodiments are possible.

Figure 10:
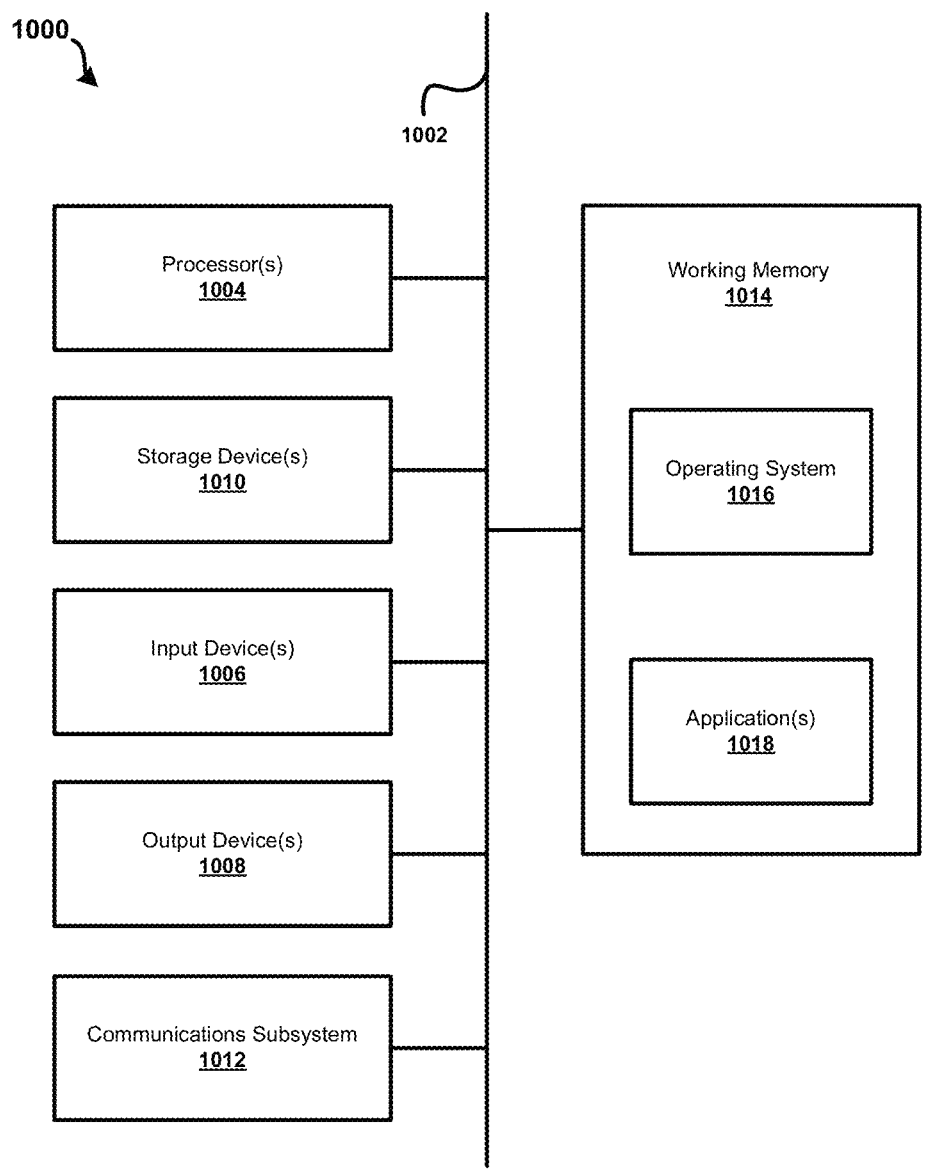
FIG. 10 shows an example computing system or device.

FIG. 10 shows an example computer system or device 1000 in accordance with the present disclosure. An example of a computer system or device includes an enterprise server, blade server, desktop computer, laptop computer, tablet computer, personal data assistant, smartphone, feature phone, gaming console, set-top-box, television receiver, and/or any other type of machine configured for performing calculations. The computer system 1000 may be wholly or at least partially incorporated as part of previously-described computing devices, such as at least the PTR 610, STRs 612a-b, televisions 614a-c, and computing devices 616a-c of at least FIG. 6. Further, the example computer device 1000 may be configured to perform and/or include instructions that, when executed, cause the computer system 1000 to perform the method of FIG. 1 and FIG. 9. Still further, the example computer device 1000 may be configured to perform and/or include instructions that, when executed, cause the computer system 1000 to instantiate and implement functionality of the CIPM 618 of at least FIG. 6.

The computer device 1000 is shown comprising hardware elements that may be electrically coupled via a bus 1002 (or may otherwise be in communication, as appropriate). The hardware elements may include a processing unit with one or more processors 1004, including without limitation one or more general-purpose processors and/or one or more special-purpose processors (such as digital signal processing chips, graphics acceleration processors, and/or the like); one or more input devices 1006, which may include without limitation a remote control, a mouse, a keyboard, and/or the like; and one or more output devices 1008, which may include without limitation a presentation device (e.g., television), a printer, and/or the like.

The computer system 1000 may further include (and/or be in communication with) one or more non-transitory storage devices 1010, which may comprise, without limitation, local and/or network accessible storage, and/or may include, without limitation, a disk drive, a drive array, an optical storage device, a solid-state storage device, such as a random access memory, and/or a read-only memory, which may be programmable, flash-updateable, and/or the like. Such storage devices may be configured to implement any appropriate data stores, including without limitation, various file systems, database structures, and/or the like.

The computer device 1000 might also include a communications subsystem 1012, which may include without limitation a modem, a network card (wireless or wired), an infrared communication device, a wireless communication device, and/or a chipset (such as a Bluetooth™ device, an 1002.11 device, a WiFi device, a WiMax device, cellular communication facilities (e.g., GSM, WCDMA, LTE, etc.), and/or the like. The communications subsystem 1012 may permit data to be exchanged with a network (such as the network described below, to name one example), other computer systems, and/or any other devices described herein. In many embodiments, the computer system 1000 will further comprise a working memory 1014, which may include a random access memory and/or a read-only memory device, as described above.

The computer device 1000 also may comprise software elements, shown as being currently located within the working memory 1014, including an operating system 1016, device drivers, executable libraries, and/or other code, such as one or more application programs 1018, which may comprise computer programs provided by various embodiments, and/or may be designed to implement methods, and/or configure systems, provided by other embodiments, as described herein. By way of example, one or more procedures described with respect to the method(s) discussed above, and/or system components might be implemented as code and/or instructions executable by a computer (and/or a processor within a computer); in an aspect, then, such code and/or instructions may be used to configure and/or adapt a general purpose computer (or other device) to perform one or more operations in accordance with the described methods.

A set of these instructions and/or code might be stored on a non-transitory computer-readable storage medium, such as the storage device(s) 1010 described above. In some cases, the storage medium might be incorporated within a computer system, such as computer system 1000. In other embodiments, the storage medium might be separate from a computer system (e.g., a removable medium, such as flash memory), and/or provided in an installation package, such that the storage medium may be used to program, configure, and/or adapt a general purpose computer with the instructions/code stored thereon. These instructions might take the form of executable code, which is executable by the computer device 1000 and/or might take the form of source and/or installable code, which, upon compilation and/or installation on the computer system 1000 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer device 1000) to perform methods in accordance with various embodiments of the invention. According to a set of embodiments, some or all of the procedures of such methods are performed by the computer system 1000 in response to processor 1004 executing one or more sequences of one or more instructions (which might be incorporated into the operating system 1016 and/or other code, such as an application program 1018) contained in the working memory 1014. Such instructions may be read into the working memory 1014 from another computer-readable medium, such as one or more of the storage device(s) 1010. Merely by way of example, execution of the sequences of instructions contained in the working memory 1014 may cause the processor(s) 1004 to perform one or more procedures of the methods described herein.

The terms "machine-readable medium" and "computer-readable medium," as used herein, may refer to any non-transitory medium that participates in providing data that causes a machine to operate in a specific fashion. In an embodiment implemented using the computer device 1000, various computer-readable media might be involved in providing instructions/code to processor(s) 1004 for execution and/or might be used to store and/or carry such instructions/code. In many implementations, a computer-readable medium is a physical and/or tangible storage medium. Such a medium may take the form of a non-volatile media or volatile media. Non-volatile media may include, for example, optical and/or magnetic disks, such as the storage device(s) 1010. Volatile media may include, without limitation, dynamic memory, such as the working memory 1014.

Example forms of physical and/or tangible computer-readable media may include a floppy disk, a flexible disk, hard disk, magnetic tape, or any other magnetic medium, a CD-ROM, any other optical medium, a RAM, a PROM, EPROM, a FLASH-EPROM, any other memory chip or cartridge, or any other medium from which a computer may read instructions and/or code.

Various forms of computer-readable media may be involved in carrying one or more sequences of one or more instructions to the processor(s) 1004 for execution. By way of example, the instructions may initially be carried on a magnetic disk and/or optical disc of a remote computer. A remote computer might load the instructions into its dynamic memory and send the instructions as signals over a transmission medium to be received and/or executed by the computer system 1000.

The communications subsystem 1012 (and/or components thereof) generally will receive signals, and the bus 1002 then might carry the signals (and/or the data, instructions, etc. carried by the signals) to the working memory 1014, from which the processor(s) 1004 retrieves and executes the instructions. The instructions received by the working memory 1014 may optionally be stored on a non-transitory storage device 1010 either before or after execution by the processor(s) 1004.

The methods, systems, and devices discussed above are examples. Various configurations may omit, substitute, or add various method steps or procedures, or system components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations may be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Furthermore, the example embodiments described herein may be implemented as logical operations in a computing device in a networked computing system environment. The logical operations may be implemented as: (i) a sequence of computer implemented instructions, steps, or program modules running on a computing device; and (ii) interconnected logic or hardware modules running within a computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method, comprising:
   receiving, from a mobile device communicatively coupled to a computing device, a digital image that captures distinguishing information that distinguishes an individual from others;
   detecting, by the computing device, a current geolocation of the mobile device at a time corresponding to when the digital image is received;
   processing the digital image to extract, by the computing device, data from the digital image that corresponds to the distinguishing information captured by the digital image;
   deriving a situational context based on the current geolocation detected at the time and the extracted data from the digital image corresponding to the distinguishing information, the deriving the situational context comprising distinguishing the situational context from at least two situational contexts of a set of situational contexts, the set of situational contexts comprising a social situational context, a business situational context, and a security situational context;

using the extracted data from the digital image to query a plurality of resources to acquire information about the individual based on a topic attributed to the derived situational context;

obtaining information about the individual based on submission of personal authentication credentials to access at least one non-publicly-accessible resource of the plurality of resources and to acquire the information about the individual, the obtaining the information about the individual based on the submission of the personal authentication credentials comprising:
processing the distinguishing information to extract data from the distinguishing information, the extracted data corresponding to a credential captured by the computing device;
using the extracted data corresponding to the credential to query the at least one non-publicly-accessible resource; and
responsive to submitting the query, retrieving at least some of the information about the individual from the at least one non-publicly-accessible resource;

arranging acquired information about the individual in a contextual order that is mapped to the derived situational context, where the acquired information is organized differently depending on to which situational context of the set of situational contexts the derived situational context corresponds, and where the acquired information is arranged so that a first portion of the acquired information precedes a second portion of the acquired information, where one of the first portion or the second portion comprises the information about the individual acquired based on the topic attributed to the situational context, and another of the first portion or the second portion comprises the at least some of the information about the individual from the at least one non-publicly-accessible resource; and sending at least a subset of the acquired information arranged in the contextual order to the computing device for presentation by a display device associated with the computing device in the contextual order.

2. The method of claim 1, further comprising performing facial recognition on an image of the individual to identify the individual.

3. The method of claim 1, further comprising performing character recognition on an image of a credential of the individual to identify the individual.

4. The method of claim 1, further comprising:
determining timing information associated with transmission of the information that distinguishes the individual from others; and
arranging the acquired information about the individual in the contextual order based at least on the timing information.

5. The method of claim 1, further comprising querying at least one publicly-accessible resource and obtaining information about the individual without submission of personal authentication credentials to access the at least one publicly-accessible resource and acquire information about the individual.

6. The method of claim 1, further comprising selecting the derived situational context from one of: the social situational context; the business situational context; and the security situational context.

7. The method of claim 1, wherein the distinguishing information comprises a spoken name that is captured by the computing device.

8. The method of claim 1, wherein the acquired information comprises an identification of when the individual was last encountered.

9. The method of claim 1, wherein the contextual order comprises a priority of information acquired from non-publicly-accessible resources before information acquired from publicly-accessible resources.

10. A computer-implemented method, comprising:
receiving, from eyewear comprising a computing device, a video or images from a display of programming by a first display device;
synchronizing timing of the received video or images to closed-captioning data associated with the programming displayed by the first display device;
sending to the computing device for presentation on a second display device communicatively coupled with the computing device and separate from the first display device the closed-captioning data associated with the programming displayed on the first display device, so that the closed-captioning data is displayed on the second display device at a particular position, based on content of the programming, within or by a lens associated with the eyewear as the second display device, in synchrony with the programming displayed on the first display device so that closed-captioning appears to be positioned on-screen with respect to the first display device at the particular position as the programming is displayed; and
arranging acquired information about an individual corresponding to the video or images in a contextual order that is mapped to a derived situational context, where the acquired information is organized differently depending on to which situational context of a set of situational contexts the derived situational context corresponds, and where the acquired information is arranged so that a first portion of the acquired information precedes a second portion of the acquired information, where one of the first portion or the second portion comprises the information about the individual acquired based on a topic attributed to the derived situational context.

11. The method of claim 10, further comprising:
receiving, from the eyewear including the computing device mounted thereto, a signal associated with the display of programming by the first display device; and
sending, to the computing device for presentation within or by a lens associated with the eyewear as the second display device in synchrony with the programming, particular data associated with the programming.

12. The method of claim 10, further comprising:
receiving, from the computing device, distinguishing information that distinguishes an individual from others;
querying at least one of a plurality of resources to acquire the acquired information about the individual; and
sending at least a subset of information arranged in the contextual order to the computing device for presentation by a display device associated therewith.

13. The method of claim 12, further comprising one of:
performing facial recognition on an image of the individual to identify the individual; or
performing character recognition on an image of a credential of the individual to identify the individual.

14. The method of claim 12, further comprising querying at least one publicly-accessible resource and obtaining information about the individual without submission of personal authentication credentials to access the at least one publicly-accessible resource and acquire information about the individual.

15. The method of claim 12, further comprising further comprising querying at least one non-publicly-accessible resource and obtaining information about the individual based on submission of personal authentication credentials to access the at least one non-publicly-accessible resource and acquire information about the individual.

16. A system, comprising:
a processing device and memory communicatively coupled to eyewear, the memory communicatively coupled with and readable by the processing device and having stored therein processor-readable instructions which, when executed by the processing device, cause the processing device to perform actions comprising:
receiving, from a mobile device communicatively coupled to the processing device, a digital image that captures distinguishing information that distinguishes an individual from others;
detecting a current geolocation of the mobile device at a time corresponding to when the digital image is received;
processing the digital image to extract data from the digital image that corresponds to the distinguishing information captured by the digital image;
deriving a situational context based on the current geolocation detected at the time and the extracted data from the digital image corresponding to the distinguishing information, the deriving the situational context comprising distinguishing the situational context from at least two situational contexts of a set of situational contexts, the set of situational contexts comprising a social situational context, a business situational context, and a security situational context;
using the extracted data from the digital image to query a plurality of resources to acquire information about the individual based on a topic attributed to the derived situational context;
obtaining information about the individual based on submission of personal authentication credentials to access at least one non-publicly-accessible resource of the plurality of resources and to acquire the information about the individual, the obtaining the information about the individual based on the submission of the personal authentication credentials comprising:
processing the distinguishing information to extract data from the distinguishing information, the extracted data corresponding to a credential captured by the computing device;
using the extracted data corresponding to the credential to query the at least one non-publicly-accessible resource; and
responsive to submitting the query, retrieving at least some of the information about the individual from the at least one non-publicly-accessible resource;
arranging acquired information about the individual in a contextual order that is mapped to the derived situational context, where the acquired information is organized differently depending on to which situational context of the set of situational contexts the derived situational context corresponds, and where the acquired information is arranged so that a first portion of the acquired information precedes a second portion of the acquired information, where one of the first portion or the second portion comprises the information about the individual acquired based on the topic attributed to the situational context, and another of the first portion or the second portion comprises the at least some of the information about the individual from the at least one non-publicly-accessible resource; and
sending at least a subset of the acquired information arranged in the contextual order to the computing device for presentation by a display device associated with the computing device in the contextual order.

17. The system of claim 16, the actions further comprising one or more of:
performing facial recognition on an image of the individual to identify the individual;
performing character recognition on an image of a credential of the individual to identify the individual;
determining timing information associated with transmission of the information that distinguishes the individual from others, and arranging the acquired information about the individual in the contextual order based at least on the timing information;
querying at least one publicly-accessible resource and obtaining information about the individual without submission of personal authentication credentials to access the at least one publicly-accessible resource and acquire information about the individual; and/or
selecting the derived situational context from one of: the social situational context; the business situational context; and the security situational context.

18. One or more non-transitory, computer-readable media having computer-readable instructions thereon which, when executed by a computing device, cause the computing device to perform actions comprising:
receiving, from a mobile device communicatively coupled to the processing device, a digital image that captures distinguishing information that distinguishes an individual from others;
detecting a current geolocation of the mobile device at a time corresponding to when the digital image is received;
processing the digital image to extract data from the digital image that corresponds to the distinguishing information captured by the digital image;
deriving a situational context based on the current geolocation detected at the time and the extracted data from the digital image corresponding to the distinguishing information, the deriving the situational context comprising distinguishing the situational context from at least two situational contexts of a set of situational contexts, the set of situational contexts comprising a social situational context, a business situational context, and a security situational context;
using the extracted data from the digital image to query a plurality of resources to acquire information about the individual based on a topic attributed to the derived situational context;

obtaining information about the individual based on submission of personal authentication credentials to access at least one non-publicly-accessible resource of the plurality of resources and to acquire the information about the individual, the obtaining the information about the individual based on the submission of the personal authentication credentials comprising:
　processing the distinguishing information to extract data from the distinguishing information, the extracted data corresponding to a credential captured by the computing device;
　using the extracted data corresponding to the credential to query the at least one non-publicly-accessible resource; and
　responsive to submitting the query, retrieving at least some of the information about the individual from the at least one non-publicly-accessible resource;
arranging acquired information about the individual in a contextual order that is mapped to the derived situational context, where the acquired information is organized differently depending on to which situational context of the set of situational contexts the derived situational context corresponds, and where the acquired information is arranged so that a first portion of the acquired information precedes a second portion of the acquired information, where one of the first portion or the second portion comprises the information about the individual acquired based on the topic attributed to the situational context, and another of the first portion or the second portion comprises the at least some of the information about the individual from the at least one non-publicly-accessible resource; and
sending at least a subset of the acquired information arranged in the contextual order to the computing device for presentation by a display device associated with the computing device in the contextual order.

19. The one or more non-transitory, computer-readable media of claim 18, the actions further comprising one or more of:
　performing facial recognition on an image of the individual to identify the individual;
　performing character recognition on an image of a credential of the individual to identify the individual;
　determining timing information associated with transmission of the information that distinguishes the individual from others, and arranging the acquired information about the individual in the contextual order based at least on the timing information;
　querying at least one publicly-accessible resource and obtaining information about the individual without submission of personal authentication credentials to access the at least one publicly-accessible resource and acquire information about the individual; and/or
　selecting the derived situational context from one of: the social situational context; the business situational context; and the security situational context.

20. A system comprising, comprising:
a processing device and memory communicatively coupled to eyewear, the memory communicatively coupled with and readable by the processing device and having stored therein processor-readable instructions which, when executed by the processing device, cause the processing device to perform actions comprising:
　receiving, from the eyewear comprising a computing device, a video or images from a display of programming by a first display device;
　synchronizing timing of the received video or images to closed-captioning data associated with the programming displayed by the first display device;
　sending to the computing device for presentation on a second display device communicatively coupled with the computing device and separate from the first display device the closed-captioning data associated with the programming displayed on the first display device, so that the closed-captioning data is displayed on the second display device at a particular position, based on content of the programming, within or by a lens associated with the eyewear as the second display device, in synchrony with the programming displayed on the first display device so that closed-captioning appears to be positioned on-screen with respect to the first display device at the particular position as the programming is displayed; and
　arranging acquired information about an individual corresponding to the video or images in a contextual order that is mapped to a derived situational context, where the acquired information is organized differently depending on to which situational context of a set of situational contexts the derived situational context corresponds, and where the acquired information is arranged so that a first portion of the acquired information precedes a second portion of the acquired information, where one of the first portion or the second portion comprises the information about the individual acquired based on a topic attributed to the derived situational context.

21. The system of claim 20, the actions further comprising:
　receiving, from the eyewear including the computing device mounted thereto, a signal associated with the display of programming by the first display device; and
　sending, to the computing device for presentation within or by a lens associated with the eyewear as the second display device in synchrony with the programming, particular data associated with the programming.

22. The system of claim 20, the actions further comprising:
　receiving, from the computing device, distinguishing information that distinguishes an individual from others;
　querying at least one of a plurality of resources to acquire the acquired information about the individual; and
　sending at least a subset of information arranged in the contextual order to the computing device for presentation by a display device associated therewith; and one or more of:
　　performing facial recognition on an image of the individual to identify the individual;
　　performing character recognition on an image of a credential of the individual to identify the individual;
　　querying at least one publicly-accessible resource and obtaining information about the individual without submission of personal authentication credentials to access the at least one publicly-accessible resource and acquire information about the individual; and/or
　　querying at least one non-publicly-accessible resource and obtaining information about the individual based on submission of personal authentication credentials to access the at least one non-publicly-accessible resource and acquire information about the individual.

23. One or more non-transitory, computer-readable media having computer-readable instructions thereon which, when executed by a computing device, cause the computing device to perform actions comprising:
- receiving, from the eyewear comprising a computing device, a video or images from a display of programming by a first display device;
- synchronizing timing of the received video or images to closed-captioning data associated with the programming displayed by the first display device;
- sending to the computing device for presentation on a second display device communicatively coupled with the computing device and separate from the first display device the closed-captioning data associated with the programming displayed on the first display device, so that the closed-captioning data is displayed on the second display device at a particular position, based on content of the programming, within or by a lens associated with the eyewear as the second display device, in synchrony with the programming displayed on the first display device so that closed-captioning appears to be positioned on-screen with respect to the first display device at the particular position as the programming is displayed; and
- arranging acquired information about an individual corresponding to the video or images in a contextual order that is mapped to a derived situational context, where the acquired information is organized differently depending on to which situational context of a set of situational contexts the derived situational context corresponds, and where the acquired information is arranged so that a first portion of the acquired information precedes a second portion of the acquired information, where one of the first portion or the second portion comprises the information about the individual acquired based on a topic attributed to the derived situational context.

24. The one or more non-transitory, computer-readable media of claim 23, the actions further comprising:
- receiving, from the eyewear including the computing device mounted thereto, a signal associated with the display of programming by the first display device; and
- sending, to the computing device for presentation within or by a lens associated with the eyewear as the second display device in synchrony with the programming, particular data associated with the programming.

25. The one or more non-transitory, computer-readable media of claim 23, the actions further comprising:
- receiving, from the computing device, distinguishing information that distinguishes an individual from others;
- querying at least one of a plurality of resources to acquire the acquired information about the individual; and
- sending at least a subset of information arranged in the contextual order to the computing device for presentation by a display device associated therewith; and one or more of:
    - performing facial recognition on an image of the individual to identify the individual;
    - performing character recognition on an image of a credential of the individual to identify the individual;
    - querying at least one publicly-accessible resource and obtaining information about the individual without submission of personal authentication credentials to access the at least one publicly-accessible resource and acquire information about the individual; and/or
    - querying at least one non-publicly-accessible resource and obtaining information about the individual based on submission of personal authentication credentials to access the at least one non-publicly-accessible resource and acquire information about the individual.

* * * * *